US012715978B2

(12) United States Patent
Koike et al.

(10) Patent No.: US 12,715,978 B2
(45) Date of Patent: Aug. 25, 2026

(54) PARTICLE-CONTAINING RESIN COMPOSITION AND MOLDED PRODUCT

(71) Applicant: DIC Corporation, Tokyo (JP)

(72) Inventors: Akihiro Koike, Sakura (JP); Yusuke Kano, Sakura (JP); Shingo Takada, Sakura (JP); Jianjun Yuan, Sakura (JP)

(73) Assignee: DIC Corporation, Tokyo (JP)

( * ) Notice: Subject to any disclaimer, the term of this patent is extended or adjusted under 35 U.S.C. 154(b) by 484 days.

(21) Appl. No.: 18/281,366

(22) PCT Filed: Mar. 22, 2022

(86) PCT No.: PCT/JP2022/012998

§ 371 (c)(1),
(2) Date: Sep. 11, 2023

(87) PCT Pub. No.: WO2022/202759

PCT Pub. Date: Sep. 29, 2022

(65) Prior Publication Data

US 2024/0174834 A1 May 30, 2024

(30) Foreign Application Priority Data

Mar. 24, 2021 (JP) ................................ 2021-050473

(51) Int. Cl.
*C08K 3/30* (2006.01)
*C08J 5/00* (2006.01)

(52) U.S. Cl.
CPC ................. *C08K 3/30* (2013.01); *C08J 5/005* (2013.01); *C08J 2381/04* (2013.01); *C08K 2003/3009* (2013.01); *C08K 2201/003* (2013.01); *C08K 2201/004* (2013.01); *C08K 2201/006* (2013.01); *C08K 2201/016* (2013.01)

(58) Field of Classification Search
CPC .................. C08K 2201/003–006; C08L 81/04
See application file for complete search history.

(56) References Cited

U.S. PATENT DOCUMENTS

2010/0142872 A1 6/2010 Egami et al.
2021/0053037 A1 2/2021 Otsu et al.

FOREIGN PATENT DOCUMENTS

JP H06-80875 A 3/1994
JP 2007-176986 A 7/2007
JP 2008-286375 A 11/2008
JP 2010-106423 A 5/2010
JP 2011-68873 A 4/2011
JP 2012-25929 A 2/2012
JP 2012-159803 A 8/2012
JP 2013-144758 A 7/2013
JP 2017-115920 A 6/2017
JP 6614471 B1 12/2019
KR 10-2019-0074915 A 6/2019

*Primary Examiner* — Wenwen Cai
(74) *Attorney, Agent, or Firm* — Troutman Pepper Locke LLP

(57) ABSTRACT

Provided is a particle-containing resin composition having an appropriate particle size and being capable of improving friction and wear resistance properties even under a high temperature and high load environment. The particle-containing resin composition according to the present invention includes a resin composition and molybdenum disulfide particles, in which a median diameter $D_{50}$ of the molybdenum disulfide particles determined by a dynamic light scattering method is 10 nm or more and 1,000 nm or less.

8 Claims, 6 Drawing Sheets

(1)LENGTH:180nm (2)WIDTH:80nm (3)HEIGHT:16nm

PARTICLE-CONTAINING RESIN COMPOSITION AND MOLDED PRODUCT

TECHNICAL FIELD

The present invention relates to a particle-containing resin composition and a molded product.

The present application claims priority based on Japanese Patent Application No. 2021-050473 filed in Japan on Mar. 24, 2021, and the content thereof is incorporated herein.

BACKGROUND ART

Molybdenum disulfide has been known as a lubricant for reduction in friction and wear in the automotive and other industries and is particularly used as liquid-base lubricants such as engine oils in various countries. Molybdenum sulfides represented by molybdenum disulfide ($MoS_2$) have been known in application as, for example, lubricants included in solid sliding members and greases (see PTL 1 to PTL 3).

Inexpensive powders made by grinding natural molybdenum disulfide minerals have micrometer order sizes and a specific gravity of about 5, which is extremely high, and thus have a disadvantage of a small effect per added weight. In addition, molybdenum disulfide generally used for the lubricant is a hexagonal crystal solid lubricant material and has been known to have almost 2H (hexagonal crystal) as a crystal structure.

CITATION LIST

Patent Literature

PTL 1: JP-A-2017-115920
PTL 2: JP-A-2013-144758
PTL 3: JP-B-6614471

SUMMARY OF INVENTION

Technical Problem

In these days while energy saving is progressing, organic polymer materials having extremely small specific gravity as compared with metals, in particular high heat resistance thermoplastic resins like engineering plastics have been being widely employed in metal replacement applications for the purpose of weight reduction for automotive materials. As one of these applications, development for gear applications requiring high sliding properties has been considered.

Of the engineering plastics, polyarylene sulfide resins (PAS) represented by polyphenylene sulfide resins (PPS) are suitably used for metal replacement applications from the viewpoint of particularly excellent chemical resistance, dimension stability, and flame retardancy. However, in a temperature range of about 100° C. to about 150° C. (for example, steady temperature range in the vicinity of engines of automobiles at the time of driving) exceeding Tg of PPS, a problem arises in that a decrease in wear resistance due to reduction in elastic modulus adversely affects the sliding properties. The present applicant tried to provide wear resistance at a high temperature range by modifying the molecular structure of the used resin in the previous study, but there was a limit when the resin alone was improved.

The present applicant has tried to provide higher sliding properties for resin compositions and molded products and to particularly provide sliding properties by adding various materials as a material satisfying reduction in elastic modulus and wear resistance originated from a nature of the resin itself under high temperature range use. However, materials satisfying properties still have not been found out.

Similarly, sufficient performance has not been obtained for the friction and wear resistance properties of particle-containing resin compositions when molybdenum disulfide particles serving as an inorganic filler are included in resins such as PAS. From the viewpoint of the weight reduction of molded products, a less added amount of the molybdenum disulfide particles is desirable on the assumption that sufficient friction and wear resistance properties are obtained. However, there is no knowledge about the relation between the content of the molybdenum disulfide particles and the friction and wear resistance properties of the particle-containing resin compositions.

An object of the present invention is to provide a particle-containing resin composition and a molded product having an appropriate particle size and being capable of improving friction and wear resistance properties even under a high temperature and high load environment.

Solution to Problem

As a result of intensive study, the inventors of the present invention have found that a surface is difficult to be scraped due to improved sliding on the surface of the particle-containing resin composition and the friction and wear resistance properties under a high temperature and high load environment can be improved due to reduction in a decrease in the elastic modulus under high temperature environment by adding nanometer-sized molybdenum disulfide particles having structures of not only 2H but also 3R (rhombohedral crystal), which cannot be achieved with conventional syntheses and natural products, as crystal structures in the resin as an inorganic filler.

In addition, nanometer-sized molybdenum disulfide particles including a plate-like structure having the 3R crystal structure, which is difficult to achieve with pulverization of mining products of the particle-containing resin composition or synthesis from general-purpose molybdenum trioxide (size in micrometer), and having a large surface area per unit weight are obtained when molybdenum disulfide particles are produced using a technology "nanometer-sized molybdenum trioxide fine particles" as a raw material that the present applicant possesses. Therefore, the inventors of the present invention have found that lubrication action is effectively and sufficiently exhibited on the surface of the particle-containing resin composition even when an extremely small amount of nanometer-sized molybdenum disulfide fine particles is added to a resin composition and, as a result, the weight reduction of the particle-containing resin composition can be achieved while the friction and wear resistance properties are being exhibited.

In other words, the present invention provides the following constitutions.

[1] A particle-containing resin composition including: a resin composition; and molybdenum disulfide particles, in which a median diameter $D_{50}$ of the molybdenum disulfide particles determined by a dynamic light scattering method is 10 nm or more and 1,000 nm or less.

[2] The particle-containing resin composition according to [1], in which a shape of primary particles of the molybdenum disulfide particles is a disk shape, a ribbon shape, or a sheet shape; and a thickness is in a range of 3 nm to 100 nm.

[3] The particle-containing resin composition according to [1] or [2], in which a specific surface area of the molybdenum disulfide particles is 10 $m^2/g$ or more measured by a BET method.

[4] The particle-containing resin composition according to any one of [1] to [3], in which a bulk density of the molybdenum disulfide particles is 0.1 $g/cm^3$ or more and 1.0 $g/cm^3$ or less.

[5] The particle-containing resin composition according to any one of [1] to [4], in which in a radial distribution function of the molybdenum disulfide particles obtained from an extended X-ray absorption fine structure (EXAFS) profile of a K absorption edge of molybdenum, a ratio (I/II) of peak intensity I caused by Mo—S to peak intensity II caused by Mo—Mo is more than 1.0.

[6] The particle-containing resin composition according to any one of [1] to [5], in which the molybdenum disulfide particles have a 2H crystal structure and a 3R crystal structure of molybdenum disulfide, in a profile of the molybdenum disulfide particles obtained from powder X-ray diffraction (XRD) using Cu-Kα rays as an X-ray source, a peak in the vicinity of 39.5° and a peak in the vicinity of 49.5° are derived from the 2H crystal structure, and a peak in the vicinity of 32.5°, a peak in the vicinity of 39.5°, and a peak in the vicinity of 49.5° are derived from the 3R crystal structure, and half widths of the peak in the vicinity of 39.5° and a peak in the vicinity of 49.5° are 1° or more.

[7] The particle-containing resin composition according to [6], in which a crystallite size of the 3R crystal structure calculated by extended-type Rietveld analysis based on an analysis formula $L=K\lambda/\beta \cos \theta$ using a diffraction profile obtained from powder X-ray diffraction (XRD) using Cu-Kα rays as an X-ray source is 1 nm or more and 150 nm or less (in the above formula, K is an instrumental constant that depends on an XRD optical system (an incident side and a detector side) and settings, L is a crystallite size [m], λ is a measured X-ray wavelength [m], β is a half width [rad], and θ is a Bragg angle of a diffraction line [rad]).

[8] The particle-containing resin composition according to [6] or [7], in which the 2H crystal structure obtained by the extended-type Rietveld analysis is formed of a crystal phase constituted of crystallites having a crystallite size of 1 nm or more and 150 nm or less calculated in accordance with the above analytical formula;

the 3R crystal structure obtained by the extended-type Rietveld analysis is formed of a crystal phase constituted of crystallites having a crystallite size of 5 nm or more and 50 nm or less calculated in accordance with the analysis formula; and when a total of a presence ratio of the crystal phase of the 2H crystal structure, the crystal phase of the 3R crystal structure, and an amorphous phase is determined to be 100%, a presence ratio of the crystal phase of the 2H crystal structure, the crystal phase of the 3R crystal structure, and the amorphous phase is 10 to 60:10 to 60:10 to 30.

[9] The particle-containing resin composition according to any one of [1] to [8], in which the molybdenum disulfide particles are contained of 0.0001% by mass or more and 10% by mass or less with respect to 100% by mass of a total mass of the particle-containing resin composition.

The particle-containing resin composition according to any one of [1] to [9], in which the resin composition is formed of one or more resins selected from polyarylene sulfide (PAS), polyetheretherketone (PEEK), polyetherketone (PEK), polyimide (PI), polybenzoimidazole (PBI), polyamideimide (PAI), polyamide (PA), phenol, epoxy, acrylic, polyethylene (PE), polyoxymethylene (POM), polyurethane, polyetherimide (PEI), polycarbonate (PC), polyethylene terephthalate (PET), polybutylene terephthalate (PBT), polystyrene (PS), polypropylene (PP), poly lactic acid (PLA), liquid crystal polymers (LCP), polyphenylene ether (PPE), acrylonitrile styrene copolymerized resins (AS), and acrylonitrile butadiene styrene copolymerized resins (ABS).

[11] molded product formed of a cured product of the particle-containing resin composition according to any one of [1] to [10].

Advantageous Effects of Invention

According to the present invention, a particle-containing resin composition and a molded product having an appropriate particle size and being capable of improving friction and wear resistance properties even under a high temperature and high load environment can be provided.

DESCRIPTION OF EMBODIMENTS

Figure 1:
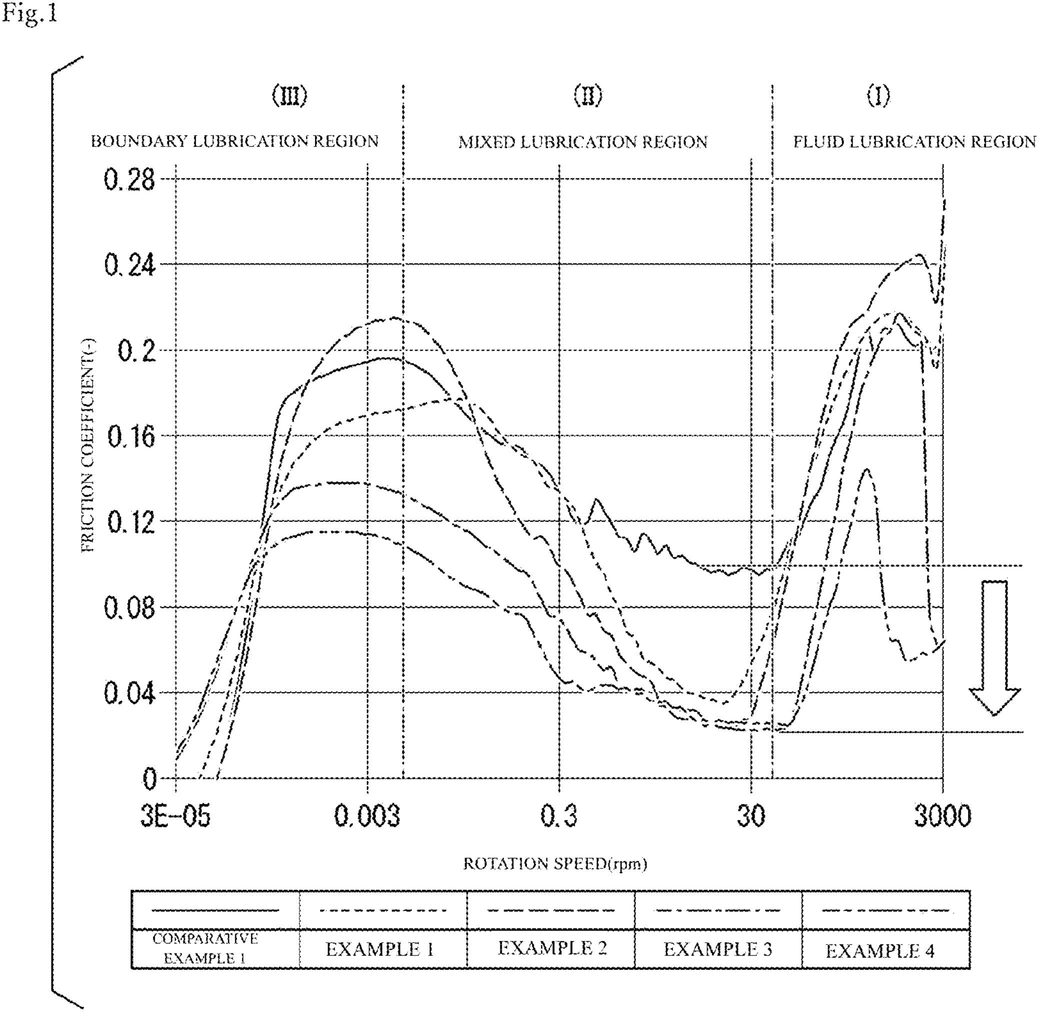
FIG. 1 is a graph showing Stribeck curves when the three test specimens of a particle-containing resin composition according to the present embodiment are fixed and a SUJ2 ball rotationally slides from upper part in the presence of a grease in each content of molybdenum disulfide particles in the resin.

Hereinafter, an embodiment of the present invention will be described in detail with reference to the drawings.

Particle-Containing Resin Composition

The particle-containing resin composition according to the present embodiment is a particle-containing resin composition including a resin composition and molybdenum disulfide particles, in which a median diameter $D_{50}$ of the molybdenum disulfide particles determined from a dynamic light scattering method is 10 nm or more and 1,000 nm or less.

Molybdenum Disulfide Particles

The molybdenum disulfide ($MoS_2$) particles according to the present embodiment preferably include a 2H crystal structure and a 3R crystal structure. Molybdenum disulfide generally used as a lubricant is a hexagonal solid lubricant material and has the 2H crystal structure alone as the crystal structure. When the molybdenum disulfide particles having the 3R crystal structure as described in the present embodiment are used as an inorganic filler added to a resin composition, the wear of the particle-containing resin composition is more reduced not only at low loads but also at high loads on surfaces where contact between the resin and the resin or between the resin and a metal may occur and thus wear may occur. Therefore, such a particle-containing resin composition has excellent friction and wear resistance properties.

That the molybdenum disulfide particles have the 2H crystal structure and the 3R crystal structure can be found by, for example, using Rietveld analysis software (High Score Plus, manufactured by Malvern Panalytical Ltd.), which can take the crystallite size into consideration. This Rietveld analysis software can calculate the crystallite size in addition to crystal structure types and the ratio thereof that are calculated by common Rietveld analysis by simulating the entire diffraction profile of XRD using a crystal structure model including the crystallite size, comparing this profile to the diffraction profile of XRD obtained from experiments, optimizing the crystal lattice constant of the crystal structure model, crystal structure factors such as atomic coordinates, weight fractions (presence ratios), and the like with a least-square method so as to minimize the residue between the diffraction profile obtained from the experiment and the diffraction profile obtained by the calculation, and identifying and quantifying each phase of the 2H crystal structure and the 3R crystal structure with high precision. Hereafter, in the present patent, the above analysis method using High Score Plus will be referred to as "extended-type Rietveld analysis".

The median diameter $D_{50}$ of the molybdenum disulfide particles in the present embodiment is 10 nm or more and 1,000 nm or less. Generally, $MoS_2$ is penetrated into gaps between contacting surfaces and this layer of $MoS_2$ is easily shifted perpendicularly to the load, whereby layered compounds containing $MoS_2$ function well as lubricants. Commercially available $MoS_2$ is crushed ore products and includes many particles with a size larger than 1 μm in a particle diameter. Therefore, the efficiency per unit weight to cover the area between contact surfaces is low. On the other hand, when the molybdenum disulfide particles are used as an inorganic filler, the molybdenum disulfide particles having a median diameter $D_{50}$ of 1,000 nm or less as the present embodiment allow the wear of the particle-containing resin composition to be reduced even when a high load is applied. This is because the number of particles and the surface area are large because of the nanometer-sized molybdenum disulfide particles and thus the number of particles effectively working in friction and wear increase. When the resin composition as a resin includes, for example, a sulfur component such as PAS, it is surmised that the sulfur atoms in the resin composition and the sulfur atoms in the molybdenum disulfide particles ($MoS_2$) as a filler can take S—S contact with each other, the molybdenum disulfide particles can be well mixed in the resin composition, and the molybdenum disulfide particles can be uniformly dispersed. It is also surmised that the molybdenum disulfide particles having a median diameter $D_{50}$ of 1,000 nm or less provide excellent dispersion stability in the resin when used in the resin composition.

The particle-containing resin composition according to the present embodiment can be applied to sliding parts, for example, sliding parts between the particle-containing resin composition and a metal member or between the particle-containing resin compositions. In this case, for example, it is conceivable that when a metallic ball and the particle-containing resin composition are pressed against each other under high load, the molybdenum disulfide particles can easily be interposed between the metallic ball and the resin composition and the molybdenum disulfide particles can be maintained in an interposed state because the median diameter $D_{50}$ of the molybdenum disulfide particles is as small as 1000 nm or less and the molybdenum disulfide particles are uniformly dispersed in the resin, and thus surface wear can be reduced.

From the viewpoint of the effect described above, the median diameter $D_{50}$ of the molybdenum disulfide particles is preferably 600 nm or less, more preferably 500 nm or less, and still more preferably 400 nm or less. The median diameter $D_{50}$ of the molybdenum disulfide particles may be 20 nm or more or may be 40 nm or more. The median diameter $D_{50}$ of the molybdenum disulfide particles is measured using, for example, a dynamic light scattering-type particle diameter distribution analyzer (Nanotrac Wave II manufactured by MicrotracBEL Corp.) or a laser diffraction-type particle size distribution analyzer (SALD-7000 manufactured by Shimadzu Corporation).

In the molybdenum disulfide particles according to the present embodiment, the crystallite size of the 3R crystal structure is 1 nm or more and 150 nm or less. The molybdenum disulfide particles having a crystallite size of the 3R crystal structure of 1 nm or more and 150 nm or less allow the friction coefficient of the particle-containing resin composition to be lowered when used as an inorganic filler contained in the resin composition and thus the friction and wear resistance properties to be improved. The crystallite size of the 3R crystal structure is preferably a value obtained by the extended-type Rietveld analysis. The friction coefficient can be measured, for example, from a Stribeck curve using a Ball on Three Plates tester or a Four Ball tester.

From the viewpoint of the effect described above, the 3R crystal structure obtained by the extended-type Rietveld analysis is preferably a crystal phase constituted of crystallites of which crystallite size obtained in accordance with the above analytical formula is 5 nm or more. The crystallite size is more preferably 10 nm or more. From the viewpoint of the effect described above, the 3R crystal structure obtained by the extended-type Rietveld analysis is preferably a crystal phase constituted of crystallites of which crystallite size obtained in accordance with the above analytical formula is 50 nm or less. The crystallite size is more preferably 40 nm or less. Further, from the viewpoint of the effect described above, the 3R crystal structure obtained by the extended-type Rietveld analysis is preferably a crystal phase constituted of crystallites of which crystallite size obtained in accordance with the above analytical formula is 5 nm or more and 50 nm or less. The crystallite size is more preferably 10 nm or more and 40 nm or less.

In the molybdenum disulfide particles according to the present embodiment, the crystallite size of the 2H crystal structure is preferably 1 nm or more. The crystallite size of the 2H crystal structure is preferably 150 nm or less. Further, the crystallite size of the 2H crystal structure is preferably 1 nm or more and 150 nm or less. The molybdenum disulfide particles having a crystallite size of the 2H crystal structure of 1 nm or more and 150 nm or less allow the friction coefficient of the particle-containing resin composition to be lowered when used as an inorganic filler contained in the resin composition and thus the friction and wear resistance properties to be improved.

The crystallite size of the 2H crystal structure is preferably a value obtained in accordance with the extended-type Rietveld analysis. The 2H crystal structure obtained by the Rietveld analysis is preferably a crystal phase constituted of crystallites of which crystallite size obtained in accordance with the above analytical formula is 1 nm or more and the crystallite size is more preferably 5 nm or more. The 2H crystal structure obtained by the extended-type Rietveld analysis is preferably a crystal phase constituted of crystallites of which a crystallite size obtained in accordance with the above analytical formula is 150 nm or less. Further, the 2H crystal structure obtained by the extended-type Rietveld analysis is preferably a crystal phase constituted of crystallites of which crystallite size obtained in accordance with the above analytical formula is 1 nm or more and 150 nm or less.

The 2H crystal structure obtained by the extended-type Rietveld analysis is preferably formed of a single crystal phase constituted of crystallites having a predetermined crystallite size. In the production method described later, the 2H crystal structure constituted of a single crystal phase can be obtained by setting the heating temperature at the heat treatment to a relatively low temperature. In this case, the crystallite size of the 2H crystal structure is more preferably 1 nm or more and preferably 5 nm or more. The crystallite size of the 2H crystal structure is more preferably 20 nm or less and preferably 15 nm or less. Further, the crystallite size of the 2H crystal structure is more preferably 1 nm or more and 20 nm or less and preferably 5 nm or more and 15 nm or less.

In the profile of the molybdenum disulfide particles obtained from the powder X-ray diffraction (XRD) using Cu-Kα rays as an X-ray source, a peak in the vicinity of 39.5° and a peak in the vicinity of 49.5° are preferably derived from the 2H crystal structure, a peak in the vicinity of 32.5°, a peak in the vicinity of 39.5°, and a peak in the vicinity of 49.5° are preferably derived from the 3R crystal structure, and half widths of the peak in the vicinity of 39.5° and a peak in the vicinity of 49.5° are preferably 1° or more. Further, the molybdenum disulfide particles may include a crystal structure such as a 1H crystal structure in addition to the 2H crystal structure and the 3R crystal structure of molybdenum disulfide.

The crystallite size of the 2H crystal structure and the crystallite size of the 3R crystal structure can also be calculated using, for example, the peak half width of the XRD diffraction profile.

The presence ratio (2H:3R) of the 2H crystal structure and the 3R crystal structure in the crystal phase obtained by the Rietveld analysis using the profile obtained from the above XRD is preferably 10:90 to 90:10. The presence ratio of the 3R crystal structure in the crystal phase of 10% or more and 90% or less allows surface wear to be further reduced when the molybdenum disulfide particles are used as the inorganic filler.

Form the viewpoint of the effect described above, the presence ratio (2H:3R) of the 2H crystal structure and the 3R crystal structure obtained by the Rietveld analysis using the profile obtained from the above XRD is more preferably 10:90 to 80:20 and still more preferably 40:60 to 80:20.

That the molybdenum disulfide particles include the 3R crystal structure, which is a metastable structure, can be distinguished by forming the peak in the vicinity of 32.5°, the peak in the vicinity of 39.5°, and the peak in the vicinity of 49.5° together from a synthesized peak of the 2H crystal structure and the 3R crystal structure in the profile obtained from the powder X-ray diffraction (XRD) using Cu-Kα rays as the X-ray source.

In practice, the presence ratio of the 2H crystal structure is determined by the peak in the vicinity of 39.5° and the broad peak in the vicinity of 49.5° using the profile obtained from the above powder X-ray diffraction (XRD). The difference between the peak in the vicinity of 39.5° and the broad peak in the vicinity of 49.5° is optimized by two peaks in the vicinity of 32.5° and two peaks in the vicinity of 39.5° to determine the presence ratio of the 3R crystal structure. That is, both of the peak in the vicinity of 39.5° and the peak in the vicinity of 49.5° are synthetic waves originated from the 2H crystal structure and the 3R crystal structure and the presence ratio of the 2H crystal structure and the 3R crystal structure in the molybdenum disulfide particles can be calculated from these synthetic waves.

The molybdenum disulfide particles may also include an amorphous phase. The presence ratio of the amorphous phase present in the molybdenum disulfide particles is represented by 100 (%)−(degree of crystallinity (%)).

In this case, for example, the 2H crystal structure obtained by the extended-type Rietveld analysis is preferably formed of a crystal phase constituted of crystallites of which crystallite size calculated in accordance with the above analytical formula is 1 nm or more and 150 nm or less and the 3R crystal structure obtained by the extended-type Rietveld analysis is preferably formed of a crystal phase constituted of crystallites of which crystallite size calculated in accordance with the above analytical formula is 5 nm or more and 50 nm or less.

When the total presence ratio of the crystal phase of the 2H crystal structure, the crystal phase of the 3R crystal structure, and the amorphous phase is determined to be 100%, the presence ratio of the crystal phase of the 2H crystal structure, the crystal phase of the 3R crystal structure, and the amorphous phase is preferably 10 to 60:10 to 60:10 to 30. The molybdenum disulfide particles having a presence ratio of the crystal phase of the 2H crystal structure, the crystal phase of the 3R crystal structure, and the amorphous phase of 10 to 60:10 to 60:10 to 30 allow the friction coefficient to be further reduced and the friction and wear resistance properties to be further improved.

The primary particles of the molybdenum disulfide particles in a two-dimensional image when the molybdenum disulfide particles are photographed with a transmission electron microscope (TEM) may have a particle shape, a spherical shape, a plate shape, a needle shape, a string shape, a ribbon shape, or a sheet shape or may have a combination of these shapes. The primary particles of the molybdenum disulfide particles preferably have a disk shape, the ribbon shape, or the sheet shape. The shape of 50 primary particles of the molybdenum disulfide particles preferably has a size in the range of Length (longitudinal)×Width (transverse) of 50 nm to 1,000 nm×50 nm to 1,000 nm, more preferably has a size in the range of 100 nm to 500 nm×100 nm to 500 nm, and still more preferably has a size in the range of 50 nm to 200 nm×50 nm to 200 nm on average. In the shape of the primary particles of the molybdenum disulfide particles, a thickness measured by an atomic force microscope (AFM) preferably has a size in the range of 3 nm or more and more preferably has a size in the range of 5 nm or more. In the shape of the primary particles of the molybdenum disulfide particles, the thickness measured by the atomic force microscope (AFM) preferably has a size in the range of 100 nm or less, more preferably has a size in the range of 50 nm or less, and still more preferably has a size in the range of 20 nm or less. The shape of the primary particles of the molybdenum disulfide particles may have a thickness that is measured with an atomic force microscope (AFM) in a size in the range of 40 nm or less, and in a size in the range of 30 nm or less. The molybdenum disulfide particles having the primary particle shape of the disk shape, the ribbon shape, or a sheet shape allow the specific surface area of the molybdenum disulfide particles to be increased. The shape of the primary particles of the molybdenum disulfide particles is preferably the disc shape, the ribbon shape, or the sheet shape and has a thickness in the range of 3 nm to 100 nm. Here, the disc shape, the ribbon shape, or the sheet shape means a thin layer shape. There is no clear distinction among the disk shape, the ribbon shape, and the sheet shape. For example, when the thickness is 10 nm or less, the shape can be determined to be the sheet shape; when the thickness is 10 nm or more and length/width is equal to or more than 2, the shape can be determined to be the ribbon shape; and when the thickness is 10 nm or more and length/width is less than 2, the shape can be determined to be the disk shape. The aspect ratio of the primary particles of the molybdenum sulfide, that is, a value of (Length (longitudinal and transverse size))/(Width (height)) is preferably 1.2 to 1,200, more preferably 2 to 800, still more preferably 5 to 400, and particularly preferably 10 to 200 on average of 50 particles. In the shape of 50 primary particles of molybdenum sulfide, the shape, the length, the width, and the thickness can also be measured by an atomic force microscope (AFM) and the aspect ratio can be calculated from the measurement results.

It is conceivable that the shape of the primary particles of the molybdenum disulfide particles is not a simple spherical shape but is the disk shape, the ribbon shape, or the sheet shape having a large aspect ratio, whereby the molybdenum disulfide particles are more efficiently interposed on the friction surfaces between the particle-containing resin composition and the material to be slid and thus reduction in the probability of contact (or contact area×time) between the material to be slid and the resin composition is expected, resulting in reducing the surface wear.

The specific surface area of the molybdenum disulfide particles measured by a BET method is preferably 10 $m^2/g$ or more, more preferably 30 $m^2/g$ or more, and particularly preferably 40 $m^2/g$ or more. The specific surface area of the molybdenum disulfide particles measured by the BET method may be 300 $m^2/g$ or less or 200 $m^2/g$ or less.

In the primary particles of the molybdenum disulfide particles, layers can be easily shifted from each other by external forces such as friction because each layer constituting the primary particles is approached by relatively weak interaction. Therefore, when the primary particles of the molybdenum disulfide particles are interposed between a metal serving as the material to be slid and the resin composition to generate friction force, the layers constituting the primary particles are shifted from each other by the friction force to lower an apparent friction coefficient and contact between the metal serving as the material to be slid and the resin composition can also be prevented.

It is conceivable that the molybdenum disulfide particles having a specific surface area measured by the BET method of 10 $m^2/g$ or more contribute to both improvement in the performance of the particle-containing resin composition and reduction in the surface wear because when the primary particles are present between the metal serving as the material to be slid and the resin composition, the area where the metal serving as the material to be slid comes into contact with the resin composition can decrease.

The bulk density of the molybdenum disulfide particles is preferably 0.1 $g/cm^3$ or more, more preferably 0.2 $g/cm^3$ or more, and still more preferably 0.4 $g/cm^3$ or more. The bulk density of the molybdenum disulfide particles is preferably 1.0 $g/cm^3$ or less, more preferably 0.9 $g/cm^3$ or less, and still more preferably 0.7 $g/cm^3$ or less. Further, the bulk density of molybdenum disulfide particles is preferably 0.1 $g/cm^3$ or more and 1.0 $g/cm^3$ or less and more preferably 0.2 $g/cm^3$ or more and 0.9 $g/cm^3$ or less. The molybdenum disulfide particles having a bulk density of 0.1 $g/cm^3$ or more and 1.0 $g/cm^3$ or less allow the molybdenum disulfide particles to be more easily exposed to the surface of the particle-containing resin composition compared to the case where the molybdenum disulfide particles having relatively high bulk density are contained in the resin composition at the same content and the friction coefficient of the particle-containing resin composition to be further reduced. In addition, the desired friction and wear resistance properties are allowed to be obtained with a smaller content than the case where molybdenum disulfide particles having a relatively high bulk density are contained as described above. Therefore, the weight reduction in the molded product using the particle-containing resin composition can be achieved.

In the radial distribution function of the molybdenum disulfide particles obtained from an extended X-ray absorption fine structure (EXAFS) profile of the K absorption edge of molybdenum, a ratio (I/II) of peak intensity I caused by Mo—S to peak intensity II caused by Mo—Mo is preferably 1.0 or more, more preferably 1.1 or more, and particularly preferably 1.2 or more.

In the crystal structure of molybdenum disulfide, the distance between Mo and S is almost the same in the 2H crystal structure and the 3R crystal structure due to a covalent bond, so that the peak intensity caused by Mo—S is the same in the 2H crystal structure and the 3R crystal structure in the extended X-ray absorption fine structure (EXAFS) profile of the K absorption edge of molybdenum. On the other hand, since the 2H crystal structure of molybdenum disulfide is the hexagonal crystal, the hexagon is located 90° directly below the same hexagon of Mo atoms, and thus the distance between Mo and Mo is shorter, and the peak intensity II caused by Mo—Mo is stronger.

Conversely, since the 3R crystal structure of molybdenum disulfide is the rhombohedral crystal, the hexagon is present not 90° directly below the hexagon but shifted by half of the hexagon, and thus the distance between Mo and Mo becomes larger and the peak intensity II caused by Mo—Mo is weaker.

The ratio (I/II) decreases in the pure 2H crystal structure of molybdenum disulfide, while the ratio (I/II) increases as the 3R crystal structure is contained more.

In the 3R crystal structure, the hexagons of the Mo atoms in each of the three layers are shifted from each other by half of the hexagon, and thus the interaction between layers is expected to be smaller and each layer is more easily slipped than in the 2H crystal structure, in which the hexagons of Mo atoms in two layers are regularly arranged vertically.

In the 2H crystal structure, it can be expected that a smaller crystallite size facilitates the occurrence of slippage on the contact surface.

The conversion ratio $R_C$ of the molybdenum disulfide trioxide particles to $MoS_2$ is preferably 70% or more, more preferably 80% or more, and still more preferably 90% or more because the presence of molybdenum trioxide is considered to adversely affect lubrication performance.

The molybdenum disulfide particles exhibit lubricating performance due to heating by friction by indicating a digit of the conversion ratio $R_C$ to $MoS_2$ close to 100% and can provide superior lubrication properties to other molybdenum disulfide materials with which molybdenum trioxide may be produced as a by-product or in which molybdenum trioxide may be contained, and a precursor thereof.

The conversion ratio $R_C$ of the molybdenum trioxide particles to $MoS_2$ can be determined from the profile data obtained by X-ray diffraction (XRD) measurement of the molybdenum disulfide particles by a RIR (reference intensity ratio) method. The conversion ratio $R_C$ to $MoS_2$ can be obtained from the following formula (1) using a RIR value $K_A$ of molybdenum disulfide ($MoS_2$) and an integrated intensity $I_A$ of the peak in the vicinity of $2\theta=14.4°\pm0.5°$ attributed to the (002) plane or the (003) plane of molybdenum disulfide ($MoS_2$), and a RIR value $K_B$ of each molybdenum oxide (for example, $MoO_3$ as a raw material and $Mo_9O_{25}$, $Mo_4O_{11}$, and $MoO_2$ as reaction intermediates) and an integrated intensity $I_B$ of each molybdenum oxide ($MoO_3$ as a raw material, and $Mo_9O_{25}$, $Mo_4O_{11}$, and $MoO_2$ as reaction intermediates).

$$R_C(\%)=(I_A/K_A)/(\Sigma(I_B/K_B))\times100 \quad (1)$$

Here, the values described in the inorganic crystal structure database (ICSD) (produced by Japan Association for International Chemical Information) can be used as the RIR values and integrated powder X-ray diffraction software (PDXL2)(manufactured by Rigaku Corporation) can be used for analysis.

The particle-containing resin composition according to the present embodiment preferably includes the molybdenum disulfide particles ($MoS_2$), but are not limited thereto. The composition may also contain molybdenum sulfide particles represented by $MoS_x$ (X=1 to 3) or one or more kinds of molybdenum sulfide particles represented by $MoS_x$ (X=1 to 3) may also be contained.

FIG. 1 is a graph showing Stribeck curves of the particle-containing resin compositions according to the present embodiment for each content of the molybdenum disulfide particles. In FIG. 1, the case where a grease (BEARLEX No. 2, manufactured by Chukyo Kasei Kogyo Co., LTD.) is interposed between a molybdenum disulfide particle-containing PAS resin composition as the particle-containing resin composition and a spherical metal material to be slid is shown as an example.

In FIG. 1, the friction state between the molybdenum disulfide particle-containing PAS resin composition (hereinafter simply referred to as a "particle-containing PAS resin composition") and the material to be slid is classified into three regions: (I) Fluid lubrication region, (II) Mixed lubrication region, and (III) Boundary lubrication region. (I) Fluid lubrication region is a region where a distance between the two surfaces of the particle-containing PAS resin composition and the material to be slid is sufficiently larger than the surface roughness of wear surfaces and the grease interposes between the two surfaces to completely separate and lubricate both surfaces. (III) Boundary lubrication region is a region where almost no distance is present between the two surfaces and the ratio of contact between the particle-containing PAS resin composition and the material to be slid is large. (II) Mixed lubrication region is a region where the distance between the two surfaces of the particle-containing PAS resin composition and the material to be slid is almost the same as the surface roughness of the wear surfaces and thus the surfaces are partially contacted and fluid lubrication and boundary lubrication occur in a mixed manner. Static friction force dominates in (III) Boundary lubrication region and dynamic friction force dominates in (II) Mixed lubrication region.

In order to evaluate the friction and wear resistance properties of the particle-containing PAS resin composition, attention is paid to (II) Mixed lubrication region. In this region, the friction coefficient decreases as the rotation speed of the material to be slid increases as a whole. In the rotation speed range of 0.03 rpm or more, the friction coefficient of the particle-containing PAS resin composition is smaller than that of a PAS resin composition not containing the molybdenum disulfide particles. In particular, even when the content of the molybdenum disulfide particles in the particle-containing PAS resin composition is mere 0.5% by mass, the friction coefficient is significantly lower than that of the PAS resin composition not containing the molybdenum disulfide particles. Further, it is found that when the content of the molybdenum disulfide particles in the particle-containing PAS resin composition is increased to 2% by mass, the minimum value of the friction coefficient of the particle-containing PAS resin composition is about 60% lower than that of the PAS resin composition not containing the molybdenum disulfide particles.

Figure 2:
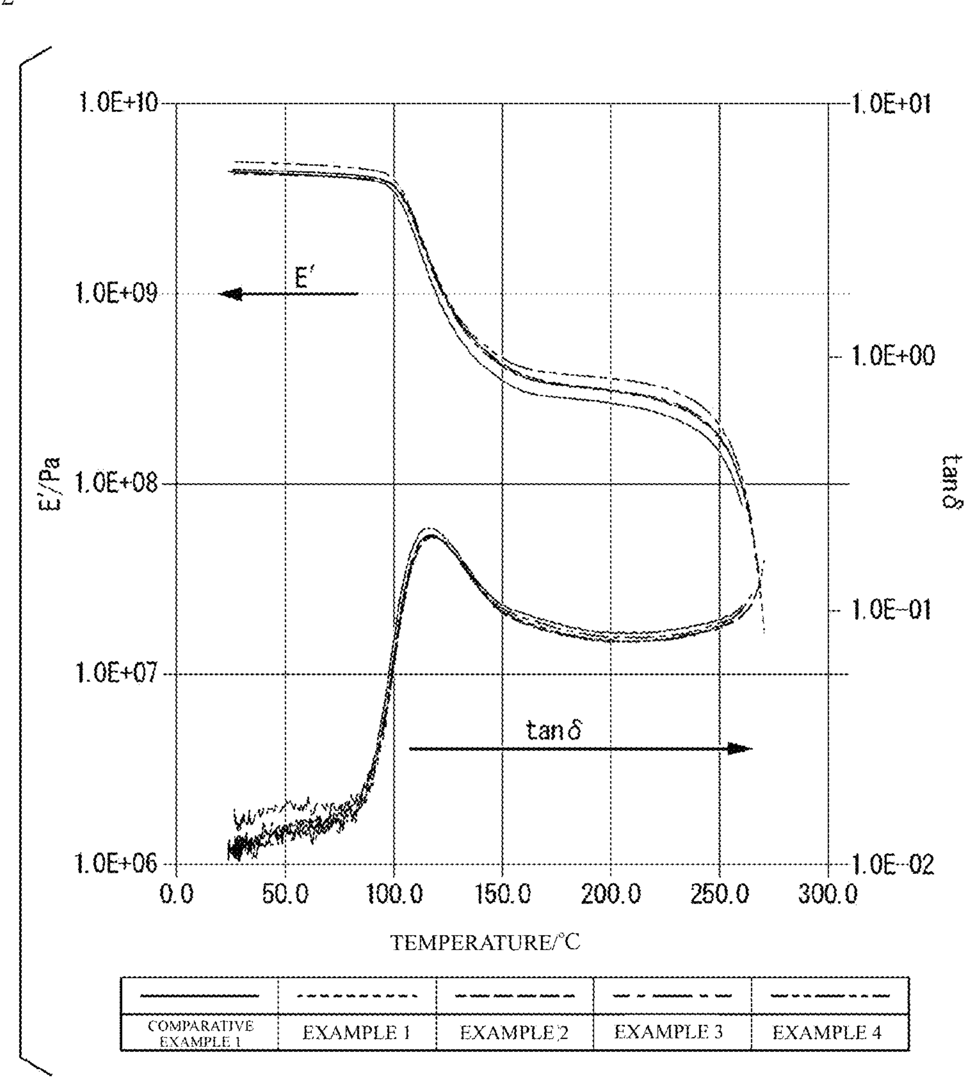
FIG. 2 is a graph showing a relationship between temperature (from about 20° C. to about 280° C.) and elastic modulus, and tan δ of a resin alone and particle-containing resin compositions.

FIG. 2 is a graph showing the relationship between temperature (in the vicinity of 20° C. to in the vicinity of 280° C.) and elastic modulus and tan δ for resin alone and the particle-containing resin compositions. In FIG. 2, the case where PPS, which is a kind of PAS, is used is shown as an example of a resin composition.

As shown in FIG. 2, a storage modulus E' of the PPS resin composition not containing the molybdenum disulfide particles significantly decreases with raising temperature in the temperature range of in the vicinity of Tg (about 100° C.) to 170° C. and deformation due to creep or other causes easily occur. On the other hand, it is found that in the same temperature range, the storage modulus E' of the particle-containing PPS resin composition according to the present embodiment is higher than that of the PPS alone even as the temperature is raised and deformation is more reduced. It is conceivable that the increase in the storage modulus E' of the particle-containing PPS resin composition is caused by, for example, the presence of the contained nanometer-sized molybdenum disulfide particles, the molybdenum disulfide particles themselves being hard inorganic particles, and the interaction between the PPS resin and the molybdenum disulfide particles. Therefore, it can be surmised that the particle-containing PPS resin composition allows the friction and wear resistance properties to be improved as compared to the PPS resin alone not containing the molybdenum disulfide particles due to presence of the molybdenum disulfide particles on the surface of the resin composition.

Method for Producing Molybdenum Disulfide Particles

The molybdenum disulfide particles can be produced, for example, by heating molybdenum trioxide particles having an average particle diameter of the primary particles of 2 nm or more and 1,000 nm or less in the presence of a sulfur source at a temperature of 200° C. to 1,000° C.

The average particle diameter of the primary particles of the molybdenum trioxide particles refers to an average value of the primary particle diameters of randomly selected 50 primary particles when the molybdenum trioxide particles are photographed with a scanning electron microscope (SEM) or a transmission electron microscope (TEM), the major axis (the Feret diameter of the longest portion observed) and the minor axis (the short Feret diameter in a direction perpendicular to the Feret diameter of the longest portion) of the minimum unit particles (that is, the primary particles) constituting aggregates on a two-dimensional image are measured, and an average value thereof is defined as the primary particle diameter.

In the method for producing molybdenum disulfide particles, the average particle diameter of the primary particles of the molybdenum trioxide particles is preferably 1 μm or less. From the viewpoint of the reactivity with sulfur, the average particle diameter is more preferably 600 nm or less, still more preferably 400 nm or less, and particularly preferably 200 nm or less. The average particle diameter of the primary particles of the molybdenum trioxide particles may be 2 nm or more, 5 nm or more, or 10 nm or more.

The molybdenum oxide particles used for producing the molybdenum disulfide particles are preferably made of an aggregate of primary particles containing molybdenum trioxide having a β crystal structure. Since the molybdenum trioxide particles have better reactivity with sulfur than conventional molybdenum trioxide particles having only α crystals as a crystal structure, and contain molybdenum trioxide having a β crystal structure, the conversion rate $R_C$ to $MoS_2$ can increase in a reaction with the sulfur source.

The β crystal structure of molybdenum trioxide can be observed by the presence of a peak (in the vicinity of 2θ:23.01°, No. 86426 (inorganic crystal structure database (ICSD)) attributed to the plane (011) of a β crystal of $MoO_3$ in a profile obtained by the powder X-ray diffraction (XRD) using the Cu-Kα rays as the X-ray source. The α crystal structure of molybdenum trioxide can be observed by the presence of a peak of the plane (021) (in the vicinity of 2θ:27.32°, No. 166363 (inorganic crystal structure database (ICSD)) of the α crystal of $MoO_3$.

The molybdenum trioxide particles preferably have a ratio (β(011)/α(021)) of intensity of a peak attributed to the plane (011) of the β crystal of $MoO_3$ (in the vicinity of 2θ:23.01°, No. 86426 (inorganic crystal structure database (ICSD)) to intensity of a peak attributed to the plane (021) of the α crystal of $MoO_3$ (in the vicinity of 2θ:27.32°, No. 166363 (inorganic crystal structure database (ICSD)) of 0.1 or more in the profile obtained by the powder X-ray diffraction (XRD) using the Cu-Kα rays as the X-ray source.

From the peak intensity attributed to the plane (011) of the β crystal of $MoO_3$ and the peak intensity attributed to the plane (021) of the α crystal of $MoO_3$, each maximum peak intensity is read to determine the ratio (β(011)/α(021)).

In the molybdenum trioxide particles, the ratio (β(011)/α(021)) is preferably 0.1 to 10.0, more preferably 0.2 to 10.0, and particularly preferably 0.4 to 10.0.

The β crystal structure of molybdenum trioxide can also be observed by the presence of peaks at wavenumbers of 773 $cm^{-1}$, 848 $cm^{-1}$, and 905 $cm^{-1}$ in a Raman spectrum obtained by Raman spectroscopy. The α crystal structure of molybdenum trioxide can be observed by the presence of peaks at wavenumbers of 663 $cm^{-1}$, 816 $cm^{-1}$, and 991 $cm^{-1}$.

The average particle diameter of the primary particles of the molybdenum trioxide powder is preferably 5 nm to 2,000 nm.

Examples of the sulfur source include sulfur and hydrogen sulfide. These sulfur sources may be used alone or in combination of two.

The method for producing molybdenum disulfide particles may include heating the molybdenum trioxide particles made of the aggregate of the primary particles containing molybdenum trioxide having the β crystal structure at a temperature of 100° C. to 800° C. in the absence of the sulfur source, and then heating at a temperature of 200° C. to 1,000° C. in the presence of the sulfur source.

The heating time in the presence of the sulfur source may be 1 hour to 20 hours, 2 hours to 15 hours, or 3 hours to 10 hours as long as the sulfurization reaction proceeds sufficiently.

In the method for producing molybdenum disulfide particles, the feed ratio of the amount of S in the sulfur source to the amount of $MoO_3$ in the molybdenum trioxide particles is preferably set under conditions under which the sulfurization reaction proceeds sufficiently. With respect to 100 mol % of the amount of $MoO_3$ in the molybdenum trioxide particles, the amount of S in the sulfur source is preferably 450 mol % or more, more preferably 600 mol % or more, and still more preferably 700 mol % or more. With respect to 100 mol % of the amount of $MoO_3$ in the molybdenum trioxide particles, the amount of S in the sulfur source may be 3,000 mol % or less, 2,000 mol % or less, or 1,500 mol % or less.

In the method for producing molybdenum disulfide particles, the heating temperature in the presence of the sulfur source may be any temperature at which the sulfurization reaction proceeds sufficiently, and is preferably 320° C. or more, more preferably 340° C. or more, and still more preferably 360° C. or more. The heating temperature may be 320° C. to 1,000° C., 340° C. to 1,000° C., or 360° C. to 500° C. By setting the heating temperature to a low temperature, the degree of crystallinity of the molybdenum disulfide particles can decrease and the presence ratio of the amorphous phase can increase.

In the method for producing molybdenum disulfide particles, the obtained molybdenum disulfide particles may be cooled and then heated as post-treatment, if necessary. In this heating treatment, for example, the molybdenum disulfide particles are calcined in an inert atmosphere. Heating and calcining the obtained molybdenum disulfide particles allow crystallization of the amorphous phase to be promoted and the degree of crystallinity to increase. With the increase in the degree of crystallinity, each of the new 2H crystal structure and the 3R crystal structure is generated, and the presence ratio of the 2H crystal structure and 3R crystal structure varies. Performing reheating as post-treatment allows the degree of crystallinity of the molybdenum disulfide particles to increase and the ease of peeling by lubrication of each layer to decrease to some extent. However, the presence ratio of the 3R crystal structure, which contributes to improvement in friction properties, increases, and thus the friction properties can be improved as compared to the case where the 2H crystal structure alone is present. The presence ratio of the 2H crystal structure to the 3R crystal structure can be adjusted by varying the temperature at which the obtained molybdenum disulfide particles are heated.

In the method for producing molybdenum disulfide particles, the molybdenum trioxide particles preferably have a $MoO_3$ content of 99.5% or more measured by X-ray fluorescence (XRF). This allows the conversion rate $R_C$ to $MoS_2$ to increase, and molybdenum disulfide having high purity and excellent storage stability, which is not likely to generate disulfide derived from impurities, to be obtained.

The molybdenum trioxide particles preferably have a specific surface area of 10 $m^2/g$ to 100 $m^2/g$ measured by the BET method.

In the molybdenum trioxide particles, the specific surface area is preferably 10 $m^2/g$ or more, more preferably 20 $m^2/g$ or more, and still more preferably 30 $m^2/g$ or more from the viewpoint of excellent reactivity with sulfur. In the molybdenum trioxide particles, the specific surface area is preferably 100 $m^2/g$ or less, may be 90 $m^2/g$ or less, or may be 80 $m^2/g$ or less from the viewpoint of facilitation in production.

In the molybdenum trioxide particles, a ratio (I/II) of peak intensity I caused by Mo—O to peak intensity II caused by Mo—Mo is preferably more than 1.1 in the radial distribution function obtained from the extended X-ray absorption fine structure (EXAFS) profile of the K absorption edge of molybdenum.

As for the peak intensity I caused by Mo—O and the peak intensity II caused by Mo—Mo, each maximum peak intensity is read to obtain the ratio (I/II). The ratio (I/II) is considered to indicate that the β crystal structure of $MoO_3$ is obtained in the molybdenum trioxide particles, and the greater the ratio (I/II), the better the reactivity with sulfur.

In the molybdenum trioxide particles, the ratio (I/II) is preferably 1.1 to 5.0, and may be 1.2 to 4.0 or may be 1.2 to 3.0.

Method for Producing Molybdenum Trioxide Particles

The molybdenum trioxide particles can be produced by vaporizing a molybdenum oxide precursor compound to form molybdenum trioxide vapor and cool the molybdenum trioxide vapor.

The method for producing molybdenum trioxide particles includes calcining a raw material mixture containing the molybdenum oxide precursor compound and a metal compound other than the molybdenum oxide precursor compound to vaporize the molybdenum oxide precursor compound so as to form molybdenum trioxide vapor. The ratio of the metal compound to 100% by mass of the raw material mixture is preferably 70% by mass or less in terms of oxide.

Figure 3:
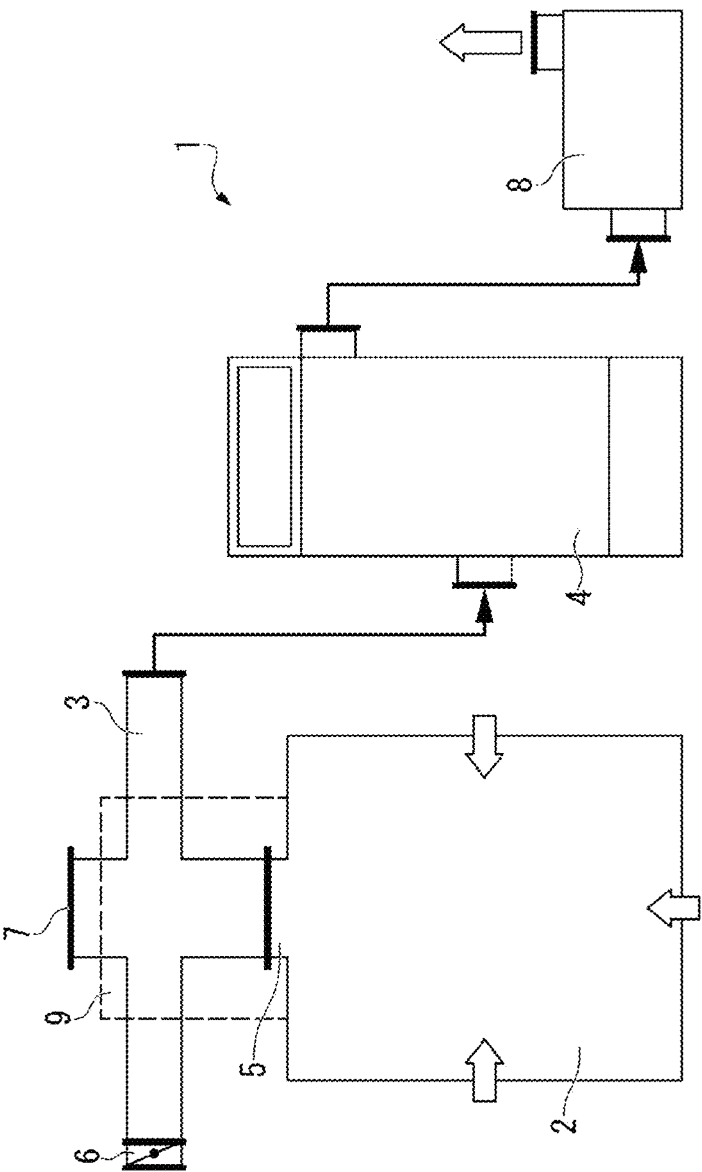
FIG. 3 is a schematic view showing one example of an apparatus used for production of molybdenum trioxide particles serving as a raw material of the molybdenum disulfide particles in the present embodiment.

The method for producing molybdenum trioxide particles can be suitably performed by using a production apparatus 1 shown in FIG. 3.

FIG. 3 is a schematic view showing an example of an apparatus used for producing molybdenum trioxide particles serving as a raw material of the molybdenum disulfide particles in the present embodiment.

As shown in FIG. 3, the production apparatus 1 includes a calcining furnace 2 for calcining the molybdenum trioxide precursor compound or the raw material mixture to vaporize the molybdenum trioxide precursor compound, a cross-shaped cooling pipe 3 connected to the calcining furnace 2 for particle forming the molybdenum trioxide vapor vaporized by the calcining, and a collection device 4 as a collection unit for collecting the molybdenum trioxide particles made by forming particles in the cooling pipe 3. At this time, the calcining furnace 2 and the cooling pipe 3 are connected to each other via a discharge port 5. Further, in the cooling pipe 3, an opening degree adjustment damper 6 is disposed at an outside air intake port (not shown) at a left end portion, and an observation window 7 is disposed at an upper end portion. An air exhauster 8, which is a first air blowing unit, is connected to the collection device 4. When the air exhauster 8 exhausts air, the collection device 4 and the cooling pipe 3 suck the inside air, and the outside air is blown into the cooling pipe 3 from the opening degree adjustment damper 6 of the cooling pipe 3. That is, the air exhauster 8 passively blows air to the cooling pipe 3 by exhibiting a suction function. The production apparatus 1 may include an external cooling device 9, which allows cooling conditions for the molybdenum trioxide vapor generated from the calcining furnace 2 to be arbitrarily controlled.

The opening degree adjustment damper 6 takes in air from the outside air intake port by opening the opening degree adjustment damper 6 and the molybdenum trioxide vapor vaporized in the calcining furnace 2 is cooled in an air atmosphere to obtain molybdenum trioxide particles, whereby the ratio (I/II) can be made more than 1.1, and the β crystal structure of $MoO_3$ can be easily obtained in the molybdenum trioxide particles. In contrast, when the molybdenum trioxide vapor is cooled in a state where an oxygen concentration in a nitrogen atmosphere is low, for example, when the molybdenum trioxide vapor is cooled using liquid nitrogen, the oxygen defect density is likely to increase and the ratio (I/II) is likely to decrease.

The molybdenum oxide precursor compound is not particularly limited as long as the precursor compound forms molybdenum trioxide vapor by being calcined, and examples thereof include metal molybdenum, molybdenum trioxide, molybdenum dioxide, molybdenum sulfide, ammonium molybdate, phosphomolybdic acid ($H_3PMo_{12}O_{40}$), silicomolybdic acid ($H_4SiMo_{12}O_{40}$), aluminum molybdate, silicon molybdate, magnesium molybdate ($MgMo_nO_{3n+1}$ (n=1 to 3)), sodium molybdate ($Na_2Mo_nO_{3n+1}$ (n=1 to 3)), titanium molybdate, ferric molybdate, potassium molybdate ($K_2Mo_nO_{3n+1}$ (n=1 to 3)), zinc molybdate, boron molybdate, lithium molybdate ($Li_2Mo_nO_{3n+1}$ (n=1 to 3)), cobalt molybdate, nickel molybdate, manganese molybdate, chromium molybdate, cesium molybdate, barium molybdate, strontium molybdate, yttrium molybdate, zirconium molybdate, and copper molybdate. These molybdenum oxide precursor compounds may be used alone or in combination of two or more thereof. The form of the molybdenum oxide precursor compound is not particularly limited. For example, the molybdenum oxide precursor compound may be in a powder form such as molybdenum trioxide, or may be in a liquid form such as an aqueous solution of ammonium molybdate. The molybdenum oxide precursor compound is preferably in the powder form having excellent handling properties and excellent energy efficiency.

As the molybdenum trioxide precursor compound, commercially available a-crystal molybdenum trioxide is particularly preferably used. Further, when ammonium molybdate is used as the molybdenum oxide precursor compound, the ammonium molybdate is converted by calcining into molybdenum trioxide that is thermodynamically stable, and thus the molybdenum oxide precursor compound to be vaporized becomes molybdenum trioxide.

The molybdenum trioxide vapor can also be formed by calcining a raw material mixture containing a molybdenum oxide precursor compound and a metal compound other than the molybdenum oxide precursor compound.

Of these materials, the molybdenum oxide precursor compound preferably contains molybdenum trioxide from the viewpoint of easily controlling the purity of the obtained molybdenum trioxide powder, the average particle diameter of the primary particles, and the crystal structure.

The molybdenum oxide precursor compound and the metal compound other than the molybdenum oxide precursor compound may form an intermediate, but even in this case, the intermediate is decomposed by calcining, and molybdenum trioxide can be vaporized in a thermodynamically stable form.

When the raw material mixture containing a molybdenum oxide precursor compound and the metal compound other than the molybdenum oxide precursor compound is calcined, the content of the molybdenum oxide precursor compound is preferably 40% by mass or more to 100% by mass or less, and may be 45% by mass or more to 100% by mass or less or 50% by mass or more to 100% by mass or less with respect to 100% by mass of the raw material mixture.

The calcining temperature varies depending on the molybdenum oxide precursor compound and the metal compound to be used, and the desired molybdenum trioxide particles, and is usually preferably a temperature at which the intermediate can be decomposed. For example, since aluminum molybdate can be formed as an intermediate when a molybdenum compound is used as the molybdenum oxide precursor compound and an aluminum compound is used as the metal compound, the calcining temperature is preferably 500° C. to 1,500° C., more preferably 600° C. to 1,550° C., and still more preferably 700° C. to 1,600° C.

The calcining time is not particularly limited, and may be, for example, 1 minute to 30 hours, 10 minutes to 25 hours, or 100 minutes to 20 hours.

The temperature rising rate varies depending on the molybdenum oxide precursor compound and the metal compound to be used, and the properties of the desired molybdenum trioxide particles, and is preferably 0.1° C./minute to 100° C./minute, more preferably 1° C./minute to 50° C./minute, and still more preferably 2° C./minute to 10° C./minute from the viewpoint of production efficiency.

Next, the molybdenum trioxide vapor is cooled to form particles.

The molybdenum trioxide vapor is cooled by lowering the temperature of the cooling pipe. In this case, examples of a cooling method include cooling by blowing a gas into the cooling pipe as described above, cooling by a cooling mechanism included in the cooling pipe, and cooling by an external cooling device.

The molybdenum trioxide vapor is preferably cooled in an air atmosphere. When the molybdenum trioxide vapor is cooled in an air atmosphere to form molybdenum trioxide particles, the ratio (I/II) can be made more than 1.1, and the β crystal structure of $MoO_3$ can be easily obtained in the molybdenum trioxide particles.

The cooling temperature (temperature of the cooling pipe) is not particularly limited, and is preferably −100° C. to 600° C., and more preferably −50° C. to 400° C.

The cooling rate of the molybdenum trioxide vapor is not particularly limited, and is preferably 100° C./s or more and 100,000° C./s or less, and more preferably 1,000° C./s or more and 50,000° C./s or less. As the cooling rate of the molybdenum trioxide vapor increases, molybdenum trioxide particles having a small particle diameter and a large specific surface area tend to be obtained.

When the cooling is performed by blowing a gas into the cooling pipe, the temperature of the blown gas is preferably −100° C. to 300° C., and more preferably −50° C. to 100° C.

The particles obtained by cooling the molybdenum trioxide vapor is transported to the collection device for collection.

In the method for producing molybdenum trioxide particles, the particles obtained by cooling the molybdenum trioxide vapor may be calcined again at a temperature of 100° C. to 320° C.

That is, the molybdenum trioxide particles obtained by the method for producing molybdenum trioxide particles may be calcined again at a temperature of 100° C. to 320° C. The calcining temperature in the re-calcining may be 120° C. to 280° C. or 140° C. to 240° C. A calcining time in the re-calcining may be, for example, 1 minute to 4 hours, 10 minutes to 5 hours, or 100 minutes to 6 hours. However, a part of the β crystal structure of molybdenum trioxide disappears due to re-calcining, and when calcining is performed at a temperature of 350° C. or more for 4 hours, the β crystal structure of the molybdenum trioxide particles disappears, the ratio (β(011)/α(021)) is 0, and the reactivity with sulfur is impaired.

As described above, the molybdenum trioxide particles suitable for producing the molybdenum disulfide particles can be produced by the method for producing the molybdenum trioxide particles.

The particle-containing resin composition according to the present embodiment can be produced by mixing the molybdenum disulfide particles of which median diameter $D_{50}$ determined by the dynamic light scattering method is 10 nm or more and 1000 nm or less in the resin composition.

Resin Composition

The resin composition according to the present embodiment is not particularly limited as long as the resin can contain the molybdenum disulfide particles as the filler. Examples of the resin include one or more resin selected from polyarylene sulfide (PAS), polyetheretherketone (PEEK), polyetherketone (PEK), polyimide (PI), polybenzoimidazole (PBI), polyamideimide (PAI), polyamide (PA), phenol, epoxy, acrylic, polyethylene (PE), polyoxymethylene (POM), polyurethane, polyetherimide (PEI), polycarbonate (PC) polyethylene terephthalate (PET), polybutylene terephthalate (PBT), polystyrene (PS), polypropylene (PP), polylactic acid (PLA), liquid crystal polymers (LCP), polyphenylene ether (PPE), acrylonitrile styrene copolymer resins (AS), and acrylonitrile butadiene styrene copolymerization resins (ABS).

From the viewpoint of the chemical bonding of the molybdenum disulfide particles with sulfur atoms, the resin may also be derivatives of one or more of the resins containing sulfur functional groups.

From the viewpoint of imparting interaction between the sulfur atoms and the molybdenum disulfide particles, the resin may also be derivatives of one or more of the resins containing sulfur functional groups.

The resin composition is more preferably PAS or the derivative thereof.

The PAS resin has a resin structure having a structure in which an aromatic ring and a sulfur atom are bonded serving as a repeating unit, and specifically, resins having a structural site represented by the following structural formula (1):

[Chemical Formula 1]

(1)

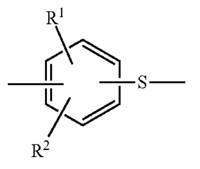

(In the formula, $R^1$ and $R^2$ each independently represent a hydrogen atom, an alkyl group, a nitro group, an amino group, a phenyl group, or an alkoxy group) as the repeating unit are preferable.

As the PAS resin, a resin containing other copolymer constituent units may be used for the purpose of controlling the crystallinity, flowability, and other properties of the resin. Specific examples of other copolymer constituent units that can be contained in the copolymer include, but not particularly limited to, meta bonds represented by the following structural formula (2), ether bonds represented by the following structural formula (3), sulfone bonds represented by the following structural formula (4), sulfidoketone bonds represented by the following structural formula (5), biphenyl bonds represented by the following structural formula (6), substituted phenyl sulfide bonds represented by the following structural formula (7), and trifunctional phenyl sulfide bonds and naphthyl bonds represented by the following structural formula (8).

The structural sites represented by the following structural formulas (2) to (7) may be contained in 30 mol % or less with respect to 100 mol % of the total amount of the structural sites and the structural site represented by the structural formula (1). In particular, the structural sites represented by the structural formulas (4) to (7) are preferably 10 mol % or less from the viewpoint of enhancing the dispersibility of molybdenum sulfide while heat resistance and mechanical strength of the PAS resin are retained. When the polyarylene sulfide resin contains structural sites represented by the structural formulas (2) to (7), the bonding type of these sites may be either of a random copolymer or a block copolymer.

[Chemical Formula 2]

(2)

(3)

(4)

(5)

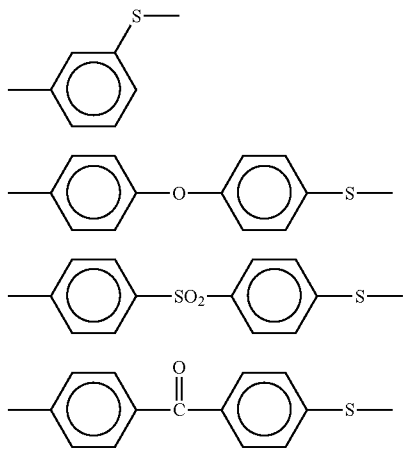

-continued (6)

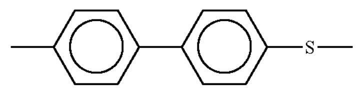

(7)

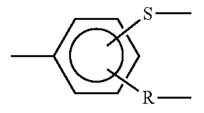

(8)

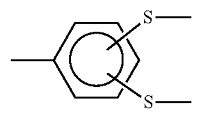

(In the formula, R represents an alkyl group, a nitro group, an amino group, a phenyl group, or an alkoxy group.)

Further, the PAS resin is mainly constituted of the above arylene sulfide units, but a constituent unit according to a disulfide bond represented by the following formula (9):

[Chemical Formula 3]

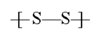 (9)

may be contained in the main chain. The PAS resin may contain the constituent unit represented by the formula (9). This allows the molybdenum disulfide particles to be more suitably dispersed.

The end of the PAS resin is not particularly specified and may be a functional group having an active hydrogen and an alkali metal salt thereof, a halogen atom, or a carboxy group such as a carboxyalkylamino group in addition to the aryl group derived from the raw material.

In order to enhance reactivity with other blended resins and derivatives and to improve mechanical strength, heat resistance, and other properties, a carboxyl group-containing polyarylene sulfide resin (hereinafter referred to as a CPAS-based resin) modified with carboxyl groups as functional groups having active hydrogen atoms in the molecular structure of the polyarylene sulfide resin may be used as the PAS resin.

Examples of the CPAS-based resins include copolymers with PAS having repeating units represented by the following general formulas (10) to (12) (Y in the general formula (11) represents —O—, $—SO_2—$, $—CH_2—$, $—C(CJ_3)_2—$, —CO—, or $—C(CF_3)_2—$). The content ratio of repeating structural units in the CPAS-based resins cannot be generally specified because the content ratio varies depending on the purpose of use and the like and is 0.5 mol % to 30 mol % and preferably 0.8 mol % to 20 mol % in the CPAS-based resins. The CPAS-based resins from such copolymerization may be a random type, a block type, or a grafted type. As the most representative example, a copolymer in which the PAS resin backbone part is a PPS resin backbone and the CPAS resin backbone part is a carboxyl group-containing polyphenylene sulfide resin (CPPS) represented by the general formula (10) may be exemplified. In this case, a PPS resin/CPPS resin is preferably 99.5/0.5 to 70/30 (by weight ratio).

[Chemical Formula 4]

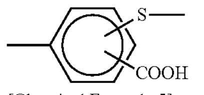

(10)

[Chemical Formula 5]

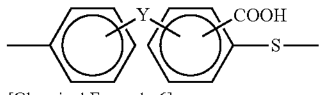

(11)

[Chemical Formula 6]

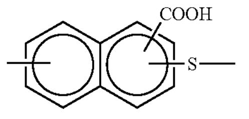

(12)

An amino group-containing polyarylene sulfide resin modified with amino groups (hereinafter, referred to as an APAS-based resin) may also be used as the PAS resin. The amino group content in the APAS-based resins is preferably 0.1 mol % to 30 mol % of the total resin composition.

The particle-containing resin composition preferably contains 0.0001% by mass or more of the molybdenum disulfide particles serving as a filler, more preferably 0.01% by mass or more, and still more preferably 0.1% or more with respect to 100% by mass of the total mass of the particle-containing resin composition. The particle-containing resin composition preferably contains 10% by mass or less of the molybdenum disulfide particles serving as a filler, more preferably 5% by mass or less, and still more preferably 1% or less with respect to 100% by mass of the total mass of the particle-containing resin composition. In particular, the particle-containing resin composition having a content of the molybdenum disulfide particles of 0.0001% by mass or more and 10% by mass or less allows the molded products of the particle-containing resin composition to be provided with sufficient friction and wear resistance properties and further weight reduction in the molded products to be achieved.

The particle-containing resin composition can further contain known additives such as viscosity modifiers, antifoaming agents, corrosion inhibitors, rust inhibitors, antioxidants, anti-wear agents, and friction adjusters. Toughness can also be provided using known and customary additives such as glass fibers.

Molded Product

The molded product according to the present embodiment is a cured product of the particle-containing resin composition, and can be widely used as a substitute for various metal parts used in moving bodies such as vehicles represented by automobiles, ships, and aircrafts, and particularly used as gears of transmissions provided in automobiles. The molded product is not limited to the molded product of the above parts using molds or the like, and may also be sheet-like, film-like, or layered members formed on the surface of the above parts. The thickness of a sheet-like, film-like, or layered member may be, for example, 100 nm or more and 1,000 μm or less.

EXAMPLES

Hereinafter, Examples of the present invention will be described. However, the present invention is not limited to Examples described later. In Examples described later, "part by mass" represents "% by mass" unless otherwise noted.

Synthesis Example

Production of Molybdenum Trioxide Particles

A calcining furnace equivalent to a heat resistant container, a cooling pipe provided with an outside air supply port, and a dust collector to collect a molybdenum oxide were prepared. A metal oxide was produced using an RHK simulator (manufactured by NORITAKE CO., LIMITED) as the calcining furnace and a VF-5N dust collector (manufactured by AMANO Corporation) as the dust collector.

1.5 kg of aluminum hydroxide (manufactured by Nippon Light Metal Company, Ltd.) and 1 kg of molybdenum trioxide (manufactured by NIPPON MUKI CO., LTD.) were mixed, and then the resultant mixture was charged in a sagger, the calcining furnace, the cooling pipe, and the dust collector were connected, and the resultant mixture was calcined at 1,100° C. for 10 hours. During the calcining, outside air (blowing speed: 150 L/min, outside air temperature: 25° C.) was introduced from a side face and a lower face of the calcining furnace. Molybdenum trioxide was evaporated in the furnace and then cooled in the vicinity of the dust collector to precipitate as particles, and thus molybdenum trioxide particle was collected with the dust collector.

After calcining, 1.0 kg of aluminum oxide, a blue powder, and 0.8 kg of the molybdenum trioxide particle collected by the dust collector were taken out from the sagger.

It was found that the collected molybdenum trioxide particle had an average particle diameter of primary particles of 1 μm or less and the purity of molybdenum trioxide measured by X-ray fluorescence (XRF) was 99.8%.

Production of Molybdenum Disulfide Particles

Example 1

Into an alumina crucible, 40.0 g (277.9 mmol) of molybdenum trioxide particle prepared in Synthesis Example 1 and 40.0 g (1,250 mmol, 4.5 equivalents to Mo atoms) of sulfur powder (manufactured by KANTO CHEMICAL CO., INC.) were placed and mixed with a stirring rod so as to prepare a uniform powder. After mixing, the alumina crucible was covered with a lid and placed in a high-temperature atmosphere calcining furnace (SKM-2030P-OP, manufactured by MOTOYAMA CO., LTD.). Calcining was performed after vacuuming inside of the furnace and then purging with nitrogen. As calcining conditions, temperature was raised from a room temperature condition of 25° C. at a rate of 5° C./min and after reaching to 500° C., the temperature was retained for 4 hours. During the calcining process, nitrogen gas was blown at 0.5 L/min. The temperature was then decreased by allowing the furnace to cool down naturally to give 44.5 g of molybdenum disulfide particles.

The sample of these molybdenum disulfide particles was measured with a specific surface area meter (BELSORP-mini manufactured by MicrotracBEL Corp.). The surface area per gram of the sample measured from the amount of the adsorbed nitrogen gas by a BET method was calculated as the specific surface area. The specific surface area was found to be 44.5 ($m^2$/g). The bulk density was measured using a bulk density measuring instrument (manufactured by Ito MFG Co. Ltd., compliant with JIS-K-5101) and an electromagnetic balance (GX-4000R, manufactured by A&D Company, Limited) and was found to be 0.283 g/$cm^3$.

With respect to 99.5 parts by mass of polyphenylene sulfide (PPS) (MA-520, manufactured by DIC Corporation), in which the aromatic ring part of PAS is phenylene, 0.5 parts by mass of the obtained molybdenum disulfide particles were added, and dispersion kneading was performed using a Labo Plastomill kneader (R60H, manufactured by TOYO SEIKI SEISAKU-SHO, LTD.) to give a particle-containing PPS resin composition as a dispersed resin piece.

Example 2

A particle-containing PPS resin composition was obtained as a dispersed resin piece in the same manner as in Example 1 except that 2.0 parts by mass of the obtained molybdenum disulfide particles were added to 98 parts by mass of PPS (MA-520, manufactured by DIC Corporation).

Example 3

A particle-containing PPS resin composition was obtained as a dispersed resin piece in the same manner as in Example 1 except that 5.0 parts by mass of the obtained molybdenum disulfide particles were added to 95 parts by mass of PPS (MA-520, manufactured by DIC Corporation) in Example 1.

Example 4

A particle-containing PPS resin composition was obtained as a dispersed resin piece in the same manner as in Example 1 except that 10 parts by mass of the obtained molybdenum disulfide particles were added to 90 parts by mass of PPS (MA-520, manufactured by DIC Corporation) in Example 1.

Comparative Example 1

A resin composition of PPS (MA-520, manufactured by DIC Corporation) alone was obtained without blending the molybdenum disulfide particles.

The molybdenum disulfide particles commonly used in Examples 1 to 4, and the particle-containing PPS resin compositions obtained in Examples 1 to 4 and the resin composition obtained in Comparative Example 1 were measured and evaluated by the following methods.

Identification and Analysis of Crystal Structures

The sample of the molybdenum disulfide particles was filled into a sample holder for measurement made of SUS with the measurement surface being smooth so that the thickness was 2.4 mm and the inner diameter was 27 mm, and the filled holder was set in a multipurpose X-ray diffraction (XRD) system (Empyrean3, manufacture by Malvern Panalytical Ltd.). Measurement was performed using a monochromator on the incident side and a semiconductor detector (1D mode) on the detector side under 45 kV/40 mA with CuKα rays, and using a rotating stage under conditions of a measurement time of 8 minutes, a step size of 0.066 degrees, and a scanning range between 5 degrees and 100 degrees inclusive, by a concentration method to give a diffraction profile.

Rietveld analysis including crystallite size evaluation was performed using software (High Score Plus, manufactured by Malvern Panalytical Ltd.).

Figure 5:
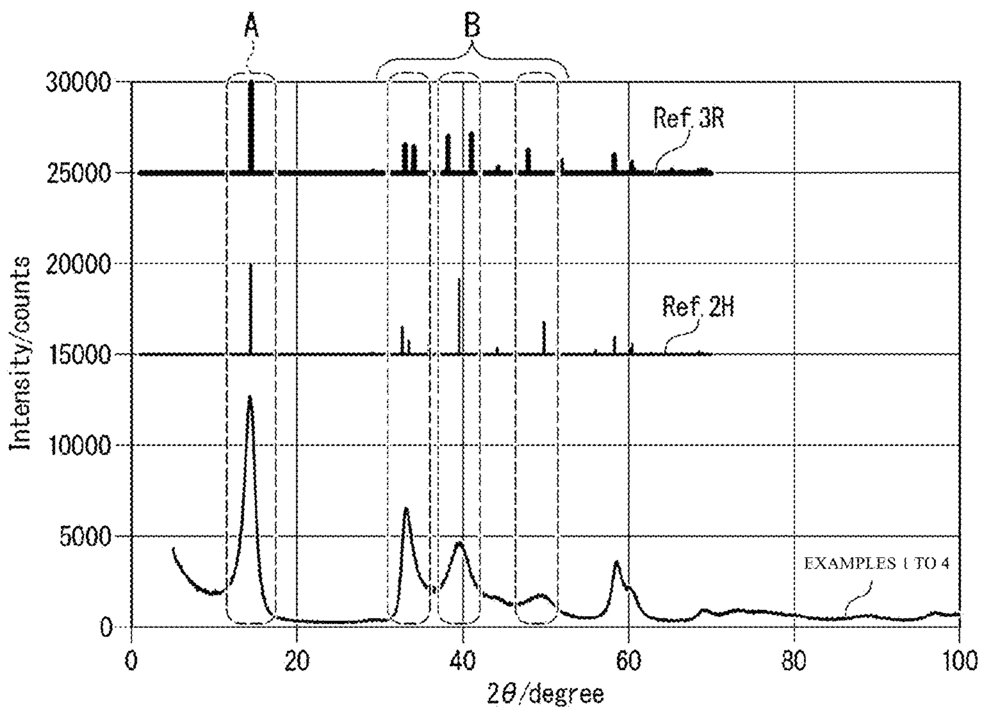
FIG. 5 is a graph showing X ray diffraction (XRD) profiles of the molybdenum disulfide particles blended in Examples 1 to 4 and reference peaks of the 2H crystal structure and the 3R crystal structure of the molybdenum disulfide.

First, a part of the X-ray diffraction (XRD) profile of the molybdenum disulfide particles commonly used in Examples 1 to 4 is shown in FIG. 5. As shown in FIG. 5, the main peak (A in FIG. 5) of the molybdenum disulfide particles used in Examples 1 to 4 coincided in the vicinity of 2θ:14° and the main peaks of the 3R crystal structure and the 2H crystal structure as the references also coincided. On the other hand, the broad peaks in the vicinity of 2θ:32.5°, in the vicinity of 2θ:39.5°, and in the vicinity of 2θ:49.5° (B in FIG. 5) almost coincided with the positions of the peaks of the 3R crystal structure and the 2H crystal structure serving as the references. The peaks in the vicinity of 2θ:39.5° and in the vicinity of 2θ:49.5° were the synthesized waves of the peaks derived from the 3R crystal structure and the 2H crystal structure, respectively, revealing that both of the 3R crystal structure and the 2H crystal structure were included.

Therefore, it was found that when Rietveld analysis of the XRD profiles of the molybdenum disulfide particles commonly used in Examples 1 to 4 was performed, two kinds of crystal structures of the 3R crystal structure and the 2H crystal structure were present.

Figure 6:
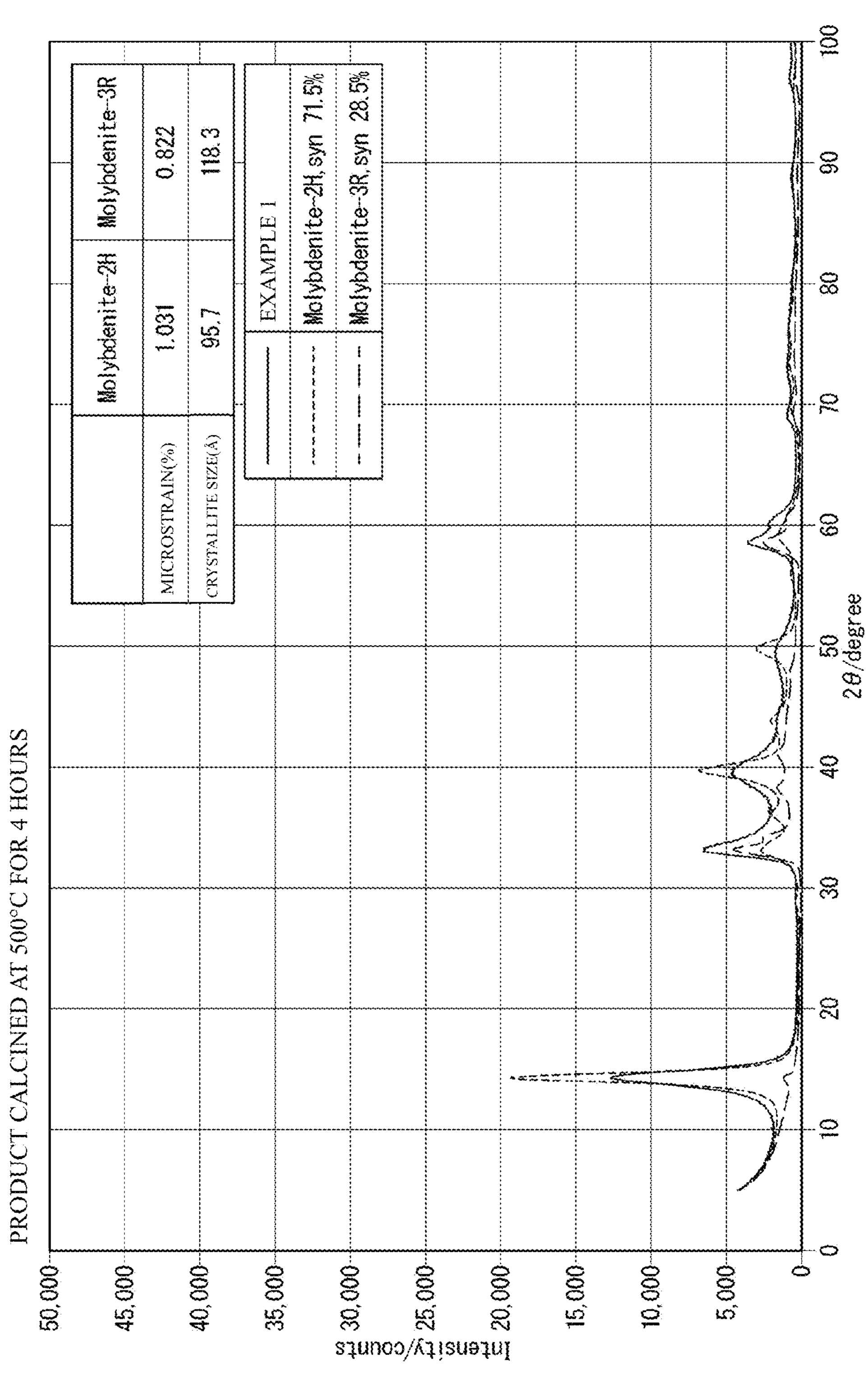
FIG. 6 is a graph showing results of calculating a ratio of the 2H crystal structure and the 3R crystal structure, and crystallite sizes obtained from Rietveld analysis from X ray diffraction (XRD) profiles of the molybdenum disulfide particles blended in Examples 1 to 4.

Specifically, in Example 1 in FIG. 6, the presence ratio of the 2H structure and the 3R crystal structure in the molybdenum disulfide particles commonly used in Examples 1 to 4 was determined by determining the crystallite size and presence ratio of the 2H structure at the broad peaks in the vicinity of 39.5° and 49.5°, and determining the difference by performing operation of reproducing the overall actually measured XRD profile by optimizing the 3R structure parameters with the two peaks in the vicinity of 32.5° and the two peaks in the vicinity of 39.5°. As a result, the ratio of 2H crystal structure and 3R crystal structure in the crystal phase was 71.5% and 28.5%, respectively.

Basic Formula and Calculation for Crystallite Size Evaluation

In general, the diffraction profiles were used to determine the crystallite sizes of the 2H crystal structure and 3R the crystal structure on the basis of an analytical formula $L=K\lambda/\beta \cos \theta$. In the above formula, K is an instrumental constant that depends on the XRD optical system (incident side and detector side) and settings, L is the crystallite size [m], λ is a measured X-ray wavelength [m], β is a half width [rad], and θ is the Bragg angle of the diffraction line [rad].

Next, the crystallite sizes of molybdenum disulfide commonly used in Examples 1 to 4 are shown in FIG. 6. As shown in FIG. 6, the crystallite size of the 2H crystal structure (crystal phase) was evaluated to be 9.6 nm and the crystallite size of the 3R crystal structure (crystal phase) was evaluated to be 11.8 nm.

Measurement of Median Diameter $D_{50}$ of Molybdenum Disulfide Particles 0.1 g of the molybdenum disulfide particle was added to 20 cc of acetone and the resultant mixture was subjected to ultrasonic treatment in an ice bath for 4 hours. Then, the concentration thereof was appropriately adjusted with acetone to a concentration within a measurable range of a dynamic light scattering-type particle diameter distribution analyzer (Nanotrac Wave II manufactured by MicrotracBEL Corp.) to give a measurement sample. Using this measurement sample, the particle diameter distribution in the range of a particle diameter of 0.0001 μm to 10 μm was measured with a dynamic light scattering-type particle diameter distribution analyzer to calculate the median diameter $D_{50}$ (z average). The median diameter $D_{50}$ obtained from this measurement was 251 nm.

Method for Observing Particle Shape of Molybdenum Disulfide Particles

The molybdenum disulfide particles were measured with an atomic force microscope (AFM) (Oxford Cypher-ES) to observe the particle shape.

Figure 7:
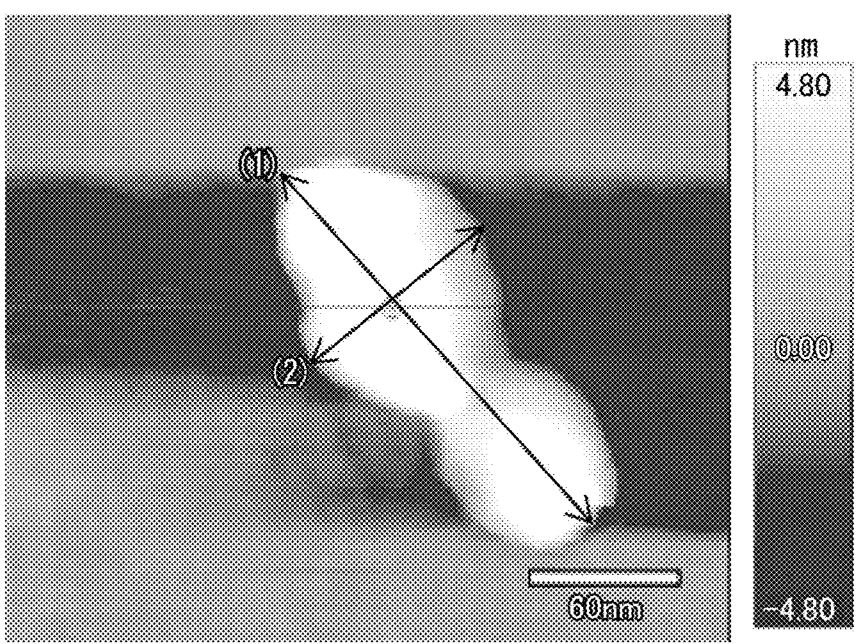
FIG. 7 is an AFM image of a synthesized molybdenum disulfide particle.
Figure 8:
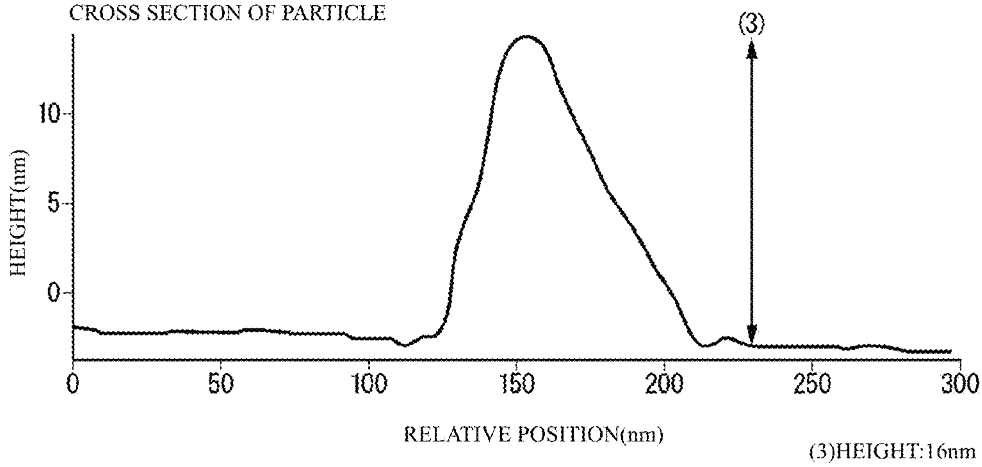
FIG. 8 is a graph showing a cross section of the molybdenum disulfide particle shown in FIG. 7.

FIG. 7 shows an AFM image of the synthesized molybdenum disulfide particles. FIG. 7 is the AFM image obtained after the measurement and shows the upper surface of a molybdenum disulfide particle. A length (longitudinal)×a width (transverse) was determined from this AFM image and was found to be 180 nm×80 nm. FIG. 8 is a graph showing the cross-section of the molybdenum disulfide particle shown in FIG. 7. A thickness (height) was determined from this cross-sectional view and was found to be 16 nm. Therefore, the value of the aspect ratio (length (vertical)/thickness (height)) of the primary particles of the molybdenum disulfide particles was 11.25.

The average value of 50 molybdenum disulfide particles including the molybdenum disulfide particle shown in FIG. 7 was Length (longitudinal)×Width (transverse)×Thickness (height)=198 nm×158 nm×19 nm.

A representative example of the AFM measurement results of the molybdenum disulfide particles is shown in Table 1. In Table 1, "Molybdenum disulfide particle (1)" is the molybdenum disulfide particle shown in FIG. 7. "Molybdenum disulfide particle (2)" is the molybdenum disulfide particle having the longest length and "Molybdenum disulfide particle (3)" is the particle having the shortest length in the measured molybdenum disulfide particles. "Molybdenum disulfide particle (4)" has relatively thick thickness, and "Molybdenum disulfide particle (5)" has the thinnest thickness. "Molybdenum disulfide particle (6)" is the particle having the largest aspect ratio. "Molybdenum disulfide particle (7)" is the particle having the thickest thickness and having the smallest aspect ratio.

TABLE 1

| | Particle shape | Length (longitudinal) [nm] | Width (transverse) [nm] | Thickness (height) [nm] | Aspect ratio [—] |
|---|---|---|---|---|---|
| Molybdenum disulfide particle (1) | Ribbon | 180 | 80 | 16 | 11.25 |
| Molybdenum disulfide particle (2) | Disk | 500 | 400 | 13 | 38.46 |
| Molybdenum disulfide particle (3) | Sheet | 60 | 60 | 5 | 12 |
| Molybdenum disulfide particle (4) | Disk | 180 | 130 | 40 | 4.5 |
| Molybdenum disulfide particle (5) | Sheet | 80 | 80 | 3 | 26.67 |
| Molybdenum disulfide particle (6) | Sheet | 320 | 300 | 4 | 80 |
| Molybdenum disulfide particle (7) | Disk | 200 | 150 | 70 | 2.86 |

Measurement of (I/II) of Molybdenum Disulfide Particles 36.45 mg of the molybdenum disulfide particles and 333.0 mg of boron nitride were mixed using a mortar. 123.15 mg of the mixture was weighed and compression molded into a tablet having a diameter of 8 mm to obtain a measurement sample. Using this measurement sample, the extended X-ray absorption fine structure (EXAFS) was measured by a transmission method with BL5S1 of Aichi Synchrotron Radiation Center. Athena (Internet <URL: https://bruceravel.github.io/demeter/>) was used for analysis.

In a radial distribution function obtained from the profile, the ratio (I/II) of the peak intensity I caused by Mo—S to the peak intensity II caused by Mo—Mo was 1.26.

Quantitative Analysis of Mo Content in Particle-Containing Resin Compositions First, the resin samples obtained in Examples 1 to 4 and Comparative Example 1 were finely crushed and subjected to dissolving treatment in a microwave device. Using ETOS One (manufactured by Milestone General K. K.), 0.1 g of each sample was first added to 5 mL of sulfuric acid, and the sample was treated at room temperature for 20 minutes, and then temperature was raised to 200° C. and the sample was treated for 20 minutes. Then, secondly, 3 mL of nitric acid was added and the resultant mixture was treated at room temperature for 2 minutes. Then, the temperature was raised to 50° C. and the resultant mixture was treated for 3 minutes, and cooled to 30° C. to treat for 20 minutes. Then, the temperature was raised to 230° C. and the resultant mixture was treated for 20 minutes. The resultant decomposition liquid was diluted to 300, 30,000, and 3,000,000 times with ultrapure water. ICP/AES measurement was performed using these diluted solutions with an ICP emission spectrometer (Optima 8300, manufactured by PerkinElmer Corp.). The obtained concentration of Mo atoms was converted to a molybdenum disulfide content in the resin.

Friction Coefficient Measurement and Friction Evaluation

Using the obtained dispersed resin pieces, injection molding was performed using a tabletop injection machine (IM12, manufactured by Xplore Instruments B.V.) to produce dumbbell-shaped molded products. In order to subject the molded product to a friction and wear test, a straight section was cut out to prepare a test specimen having a length of 16 mm, a width of 4 mm, and a thickness of 2 mm.

Figure 4:
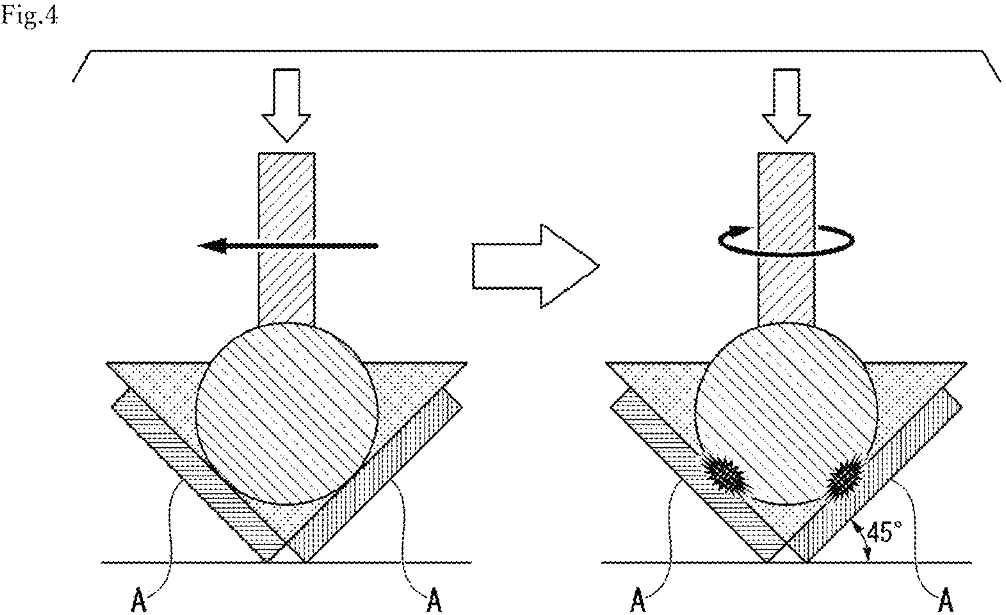
FIG. 4 is a view showing a test method with a Ball on Three Plates tester when friction coefficients are measured.

The friction and wear test was performed using a rheometer testing machine (MCR-502, manufactured by Anton Paar GmbH) equipped with a temperature-controlled stage dedicated for sliding property evaluation (product name "Tribocell") and using a jig dedicated for ½-inch SUJ2 ball. As shown in FIG. 4, three test specimens A (a thickness of 2 mm, a width of 6 mm, and a length of 15 mm) were laid with spacers and inclined at 45 degrees in the height direction using a dedicated metal fitting. A grease (BEARLEX No. 2, manufactured by Chukyo Kasei Kogyo Co., LTD.) was interposed from the upper part of the stage evenly arranged at 120 degrees from each other in the horizontal direction when viewed from directly above, and then a predetermined load was applied in a vertical direction to a ½-inch SUJ2 special stainless-steel ball. After leaving to stand for 5 minutes, the rotation speed of this SUJ2 ball varied from $3.0\times10^{-5}$ rpm to 3,120 rpm, and the friction coefficient at each rotation speed was recorded. The case where the local minimum value of the friction coefficient was 0.05 or less is determined to be excellent "o", whereas the case where local minimum value of the friction coefficient exceeds 0.05 was determined to be poor "x".

Viscoelasticity Evaluation

Using the dumbbell-shaped molded products of Examples 1 to 4 and Comparative Example 1 prepared by injection molding, the storage modulus E' and tan δ were measured using a dynamic viscoelasticity apparatus (DMS6100 (double-held bending, stress-controlled type), manufactured by Hitachi High-Tech Science Corporation). The measurement conditions were set to a temperature rising rate of 5° C./min and a strain amplitude of 10 μm under a nitrogen atmosphere. The measurement test specimen length (fixing jig width), thickness, and width were set to 20 mm, 2 mm, and 5 mm, respectively.

The results of the above measurements and evaluations are shown in Tables 2 and 3 and shown in FIGS. 1, 2, 5, and 6.

TABLE 2

| | $MoS_2$ Particle | | | 3R Crystal structure (Crystal phase) | | 2H Crystal structure (20 nm or less) | |
|---|---|---|---|---|---|---|---|
| | Degree of crystallinity [%] | Presence ratio of amorphous phase [%] | $D_{50}$ [nm] | Presence ratio in crystal phase [%] | Crystallite size [nm] | Presence ratio in crystal phase [%] | Crystallite size [nm] |
| Example 1<br>Example 2<br>Example 3<br>Example 4 | 78.7 | 21.3 | 251 | 28.5 | 11.8 | 71.5 | 9.6 |
| Comparative Example 1 | — | | — | — | | — | |

TABLE 3

| | Particle-containing PPS resin composition | | | Dynamic viscoelasticity | | | | |
|---|---|---|---|---|---|---|---|---|
| | $MoS_2$ Blended amount [% by mass] | $MoS_2$ Analysis value [% by mass] | PPS content [% by mass] | E' at 50° C. [GPa] | E' at 120° C. [GPa] | E' at 170° C. [GPa] | Friction coefficient (at 20 rpm) [—] | Friction evaluation |
| Example 1 | 0.5 | 0.53 | 99.5 | 4.4 | 1.2 | 0.34 | 0.040 | ○ |
| Example 2 | 2.0 | 2.0 | 98.0 | 4.2 | 1.2 | 0.35 | 0.024 | ○ |
| Example 3 | 5.0 | 5.0 | 95.0 | 4.4 | 1.1 | 0.34 | 0.023 | ○ |
| Example 4 | 10.0 | 11.8 | 90.0 | 4.8 | 1.2 | 0.39 | 0.026 | ○ |
| Comparative Example 1 | 0 | 0.00030 | 100.0 | 4.3 | 0.93 | 0.29 | 0.096 | x |

The friction coefficients calculated in Examples 1 to 4 and Comparative Example 1 and the results of the friction evaluation are shown in Table 3. As can be seen from the results in Table 3, each median diameter $D_{50}$ of the molybdenum disulfide particles commonly used in Examples 1 to 4 is 251 nm, and the length (longitudinal)×width (transverse)×thickness (height) measured by AFM is 198 nm×158 nm×19 nm. It was found that the increased content resulted in smaller friction coefficients and improved friction properties, as compared to Comparative Example 1, which did not contain the molybdenum disulfide particles.

As can be seen from the results in Table 3 and FIG. 2, the values of the storage modulus E' in each of Examples 1 to 4 at 120° C. and 170° C. were higher than that in Comparative Example 1, and deformation in the temperature range higher than Tg (about 100° C.) was reduced compared to Comparative Example 1, resulting in improved friction and wear resistance properties.

REFERENCE SIGNS LIST

1: Production apparatus
2: Calcining furnace
3: Cooling pipe
4: Collection device
5: Discharge port
6: Opening degree adjustment damper
7: Observation window
8: Air exhauster
9: External cooling device

The invention claimed is:

1. A particle-containing resin composition comprising:

a polyarylene sulfide (PAS) resin; and molybdenum disulfide particles, wherein a median diameter $D_{50}$ of the molybdenum disulfide particles determined by a dynamic light scattering method is 20 nm or more and 400 nm or less, a primary particle shape of the molybdenum disulfide particles is a disk shape, a ribbon shape, or a sheet shape, and a thickness is in a range of 3 nm to 100 nm.

2. The particle-containing resin composition according to claim 1, wherein the median diameter $D_{50}$ of the molybdenum disulfide particles determined by the dynamic light scattering method is 20 nm or more and 400 nm or less, the shape of the primary particles of the molybdenum disulfide particles is in a range of length (longitudinal) of 100 nm to 500 nm, a range of width (transverse) of 100 nm to 500 nm, both in an average of a measurement sample of 50 particles, and the thickness is in a range of 10 nm to 100 nm.

3. The particle-containing resin composition according to claim 1, wherein the molybdenum disulfide particles have a specific surface area of 10 $m^2/g$ or more measured by a BET method.

4. The particle-containing resin composition according to claim 1, wherein a bulk density of the molybdenum disulfide particles is 0.1 $g/cm^3$ or more and 1.0 $g/cm^3$ or less.

5. The particle-containing resin composition according to claim 1, wherein the molybdenum disulfide particles have a 2H crystal structure and a 3R crystal structure of molybdenum disulfide.

6. The particle-containing resin composition according to claim 1, wherein the particle-containing resin composition contains 0.0001% by mass or more and 10% by mass or less of the molybdenum disulfide particles with respect to 100% by mass of the total mass of the particle-containing resin composition.

7. A molded product which is a product comprising the particle-containing resin composition according to claim 1.

8. A molded product which is a product comprising the particle-containing resin composition according to claim 6.

* * * * *